United States Patent
Ford

(10) Patent No.: US 7,577,606 B1
(45) Date of Patent: Aug. 18, 2009

(54) SYSTEM AND METHOD FOR MANAGING TIER-PRICED COMMODITIES TRANSACTIONS

(76) Inventor: Robert M. Ford, 2929 Lovers La., Saint Joseph, MO (US) 64506

( * ) Notice: Subject to any disclaimer, the term of this patent is extended or adjusted under 35 U.S.C. 154(b) by 261 days.

(21) Appl. No.: 11/034,293

(22) Filed: Jan. 12, 2005

Related U.S. Application Data

(62) Division of application No. 09/330,446, filed on Jun. 11, 1999, now Pat. No. 6,862,580.

(51) Int. Cl.
*G06Q 40/00* (2006.01)
*G06Q 30/00* (2006.01)

(52) U.S. Cl. .......................................... 705/37; 705/26

(58) Field of Classification Search ................. 705/26, 705/36 R, 37
See application file for complete search history.

(56) References Cited

U.S. PATENT DOCUMENTS

| | | | |
|---|---|---|---|
| 4,752,877 A | 6/1988 | Roberts et al. | |
| 5,758,328 A | 5/1998 | Giovannoli | |
| 5,835,896 A | 11/1998 | Fisher et al. | |
| 5,970,479 A | 10/1999 | Shepherd | |
| 5,974,403 A | 10/1999 | Takriti et al. | |
| 6,026,383 A * | 2/2000 | Ausubel | 705/37 |
| 6,047,274 A | 4/2000 | Johnson et al. | |
| 6,105,000 A | 8/2000 | Hickman et al. | |
| 6,169,979 B1 | 1/2001 | Johnson | |
| 6,216,956 B1 * | 4/2001 | Ehlers et al. | 236/47 |
| 6,266,651 B1 * | 7/2001 | Woolston | 705/27 |

FOREIGN PATENT DOCUMENTS

WO    WO98/26363    6/1998

OTHER PUBLICATIONS

Oren et al. "Interruption Insurance for Generation and Distribution of Electric Power." Journal of Regulatory Economics, vol. 2, No. 1, pp. 5-19, 1990.*
Bushnell et al. "Bidder Cost Revelation in Electric Power Auctions." Journal of Regulatory Economics, vol. 6, No. 1, pp. 5-26, 1994.*

(Continued)

*Primary Examiner*—Susanna M Diaz
(74) *Attorney, Agent, or Firm*—Brandon N. Sklar, Esq.; Kaye Scholer LLP

(57) ABSTRACT

Methods and systems for managing the sale of a tier-priced commodity are described. Risk is managed by bundling with the commodity at the lower tier a financial instrument designed to indemnify against the risks associated with purchasing the commodity at the lower tier. The financial instrument may be an insurance instrument, for example. In one embodiment, prices of a commodity at two and a price or value of a financial instrument are determined. The purchase price of the bundled product is a function of the price of the commodity at the lower tier and the price or value of the financial instrument, which may depend, in part, on the purchaser. Different prices may be offered to different purchasers for respective bundled products. Other embodiments relate to selling bundled products over a network, such as the Internet, auctioning bundled products, and searching for the best price of a bundled product.

19 Claims, 8 Drawing Sheets

OTHER PUBLICATIONS

Chao et al. "Priority Service: Pricing, Investment, and Market Organization." American Economic Review, vol. 77, No. 5, pp. 899-916, 1987.*

Deng et al. "Priority Network Access Pricing for Electric Power." Journal of Regulatory Economics, vol. 19, No. 3, pp. 239-270, 2001.*

Strauss et al. "Priority Pricing of Interruptible Electric Service With an Early Notification Option." Energy Journal, vol. 14, No. 2, pp. 175(22), 1993.*

Doucet. "Coordination of Non-Utility Generation Through Priority Purchase Contracts." Energy Journal, vol. 15, No. 1, pp. 179(13), 1994.*

Doucet et al. "Onsite Backup Generation and Interruption Insurance for Electricity Distribution." Energy Journal, vol. 12, No. 4, p. 79(15), 1991.*

"Bargaining With Mother Nature—GuaranteedWeather. A New Direction In Weather-Risk Risk Management", UtiliCorp United Inc., Feb. 1998.

"Managing Energy KC Region Surfaces as America's Epicenter", Ingrams's, pp. 44-52, Mar. 1999.

"Energy Insurance Brokers", 1997, http://electricnet.com/cofolder/engyins.htm.

Preferred Energy Services, Inc., "Experts in Utility Cost Control", 1997, http://www.prefenergy.com.

Preferred Energy Services, Inc., "Energy Procurement", (undated) printed Feb. 19, 1999, http://www.prefenergy.com.

"Power Surge How One Company is Transforming the Energy Industry", Fortune, Advertising Insert S1-S4, Mar. 29, 1999.

Tom Patterson; "Power Play: Mandate Leads to Internet Market For Electricity"; Electronic Commerce Advisor, pp. 17-24, Nov./Dec. 1998.

Downes, John & Jordan Elliot Goodman; "Dirtionary of Finance and Investment Terms (4th Ed.)"; Barron's-Educational Series, Inc., pp. 68-71, 236-237, 390-391, and 450-453. Published in 1995.

"Cigna Property & Casualty Lanches New Cigna Power Products Unit"; PR Newswire, p. 0727PHMO42, Jul. 27, 1998.

"New Line of Cigna Insurance Products Designed to Help Market Manage Risk"; Power Markets Week, vol. 69, No. 32, p. 4. Aug. 10, 1998.

"Cigna Announces Products to Insure Against Price Swings in Power Markets"; Global Power Report, vol. 76, No. 147, Aug. 7, 1998.

Gift Mullins, Ronald; "Cigna Unit Turns On the Power in Newest Risk Management Offering"; Journal of Commerce, INS section, p. 5A, Aug. 10, 1998.

Liu, Yuin-Hong; "A Study On the Application of Power Pool System in Taiwan- the England and Wales Experiences"; Power Generation Engineering Monthly, Issue 602 p. 9-25; 1998.

McLean, Bethany; "Need Electricity? Call Your Broker"; Fortune; United States.

Gill, Douglas; "Marketer-movers"; Oil & Gas Inventor, vol. 13 n2;pp. 44-49, Feb. 1993; United States.

Richter, Jr., Charles W. and Sheble, Gerald B.; "Bidding Strategies that Minimize Risk with Options and Future Contracts"; Proceeding of the 1998 American Power Conference; Apr. 1998.

Wolak, Frank A.; "An Empirical Analysis of the Impact of Hedge Contracts on Bidding Behavior in a Competitive Electricity Market"; Draft prepared for the Fourth Annual Power Research Conference, Berkeley, California, Mar. 5, 1999.

http://www.fiafii.org/tutorial/professional4.htm; "Futures Industry Institute: Introduction: Market Institutions and Professionals"; Copyrighted 1998. Downloaded Mar. 9, 2001.

http://soc-dlco.Im.com/Download/Documents/DLC_RFP.HTML;"Request for Proposals: Soicitations for Bids to Purchase Firm Power from Duquesne Light Company."; Jun. 1997. Downloaded Mar. 8, 2001.

* cited by examiner

SYSTEM AND METHOD FOR MANAGING TIER-PRICED COMMODITIES TRANSACTIONS

RELATED APPLICATION

The present application is a division of application Ser. No. 09/330,446, filed on Jun. 11, 1999 now U.S. Pat. No. 6,862,580, which is incorporated by reference, herein.

FIELD OF THE INVENTION

The present invention relates to a system and method for managing the sales of a commodity within a tiered pricing structure. More particularly, the present invention relates to a system and method for managing the risks and costs of delivering a commodity from a less expensive tier by use of a financial instrument to indemnify against loss from risks associated with purchasing a commodity from that tier.

BACKGROUND OF THE INVENTION

Deregulation of the various utility industries is creating new opportunities for utility customers to reduce their cost of purchasing water, electricity, natural gas and telecommunications services. Traditionally, because of government regulation, customers in a given geographic area were restricted to purchasing their utilities from single sources (i.e. there was no choice as to where a consumer could buy his or her power, all of a consumer's electricity came from a single local electric utility). Today, most power (primarily electricity) customers rely on what is referred to as "firm" power provided by their local utility companies.

Considering electricity as an example, "firm electric power" means electricity is delivered to the customer on a non-interruptible high-priority basis (i.e. 24 hours a day, 7 days a week throughout the year). Electric utilities must supply electricity to its firm power customers on demand. Because of its guaranteed availability, this is the most expensive long term contractual power a customer may purchase. An alternative to this is for the customer to purchase "interruptible power". Because interruptible power rates are generally substantially lower than firm power rates, the customer can realize a significant savings. The downside to the use of interruptible power by the customer is that it may not be available when the customer needs or wants it and therefore the customer or the customer's utility provider may be forced to buy power from an alternative source (also referred to as "spot" power). Spot power is typically much more expensive than interruptible or firm power and it may not be economically feasible for a customer to buy spot power for short durations when their interruptible power is unavailable.

The distinction between interruptible electric power and firm electric power creates a two-tiered pricing structure for electricity as a commodity (there are additional sub-tiers such as industrial, retail, and utility-to-utility power). Traditionally, if an electric power customer wanted to take advantage of low cost interruptible power they would have to gamble that the additional costs due to having to purchase spot power during an interruption would not be greater than the savings attributed to using interruptible power. Because most interruptions in interruptible electric power are due to seasonal weather (heat in particular) changes it is possible to estimate from historical data how much spot power a customer may have to purchase during a given period of time.

One method of dealing with the risk interruptions would be to set aside, hopefully in some type of profitable investment, an amount of money equivalent to the estimated costs of purchasing spot power for the predicted interruptions. While a possible solution, this method would be difficult for the average utility customer to implement because of the lack of available information and skill with determining the frequency of interruptions. Another option, if available, would be to purchase interruptible power during the time of year when interruptions are unlikely and buy firm power when interruptions are likely to occur. While better than purchasing nothing but interruptible power, this method does not provide the same savings as it is possible to realize using a larger percentage of interruptible power and it is still possible to be surprised by interruptions requiring the customer to buy spot power.

SUMMARY OF THE INVENTION

What is needed is a system that allows the customer to buy less expensive interruptible power from the least expensive power generating utility or broker and avoid the risk of loss of power. A method which combined the sale of interruptible power with a financial instrument designed to indemnify against loss resulting from foreseeable interruptions would achieve this goal. A system which allows the customer to purchase or contract with a power broker/utility via a computer connected to the Internet or similar network would also be highly desirable. It would also be advantageous if the system allowed the customer to compare purchase prices from several different providers in order to provide the customer with the best possible price. It would also be advantageous if the system allowed the customers to bid on available utility resources rather than paying a fixed rate, thereby allowing customers to realize a savings and utilities to efficiently sell off unused capacity.

One embodiment of the present invention teaches a method for managing the sales of a tier-priced commodity such as electricity. The method comprises determining the prices of the commodity at the available tiers and determining the price of a financial instrument, such as an insurance instrument, to indemnify the risk. The risk may vary based on the purchaser. The commodity at the lower tier is bundled with the insurance instrument and a price for the bundled product is determined based, at least in part, on the price of the commodity at the lower tier and the price of the insurance instrument. The insurance instrument may cover the cost of any potential loss incurred by the purchase of the commodity at a given tier, including the cost of purchasing the commodity from an alternative source. For example, it may be necessary for a utility selling the commodity to purchase the commodity on the spot market, at higher prices than the lower tier price, for example. While the invention discussed herein may be applied to numerous tier-priced commodities and services for which there is a quality of service distinction (i.e. telecommunications services, such as telecommunications bandwidth), the preferred embodiment discussed herein will focus on the management of the sales of electrical power.

The transaction may be carried about between the seller of electrical power and the customer, both wholesale (another utility, a municipality, rural cooperative or large manufacturing concern) and retail (individual consumers), via a seller's computer and a customer's computer over a computer network, for example.

Yet another preferred embodiment allows the customer, through the use of a personal computer, to compare the cost of a commodity from different sources and financial instruments from different sources which may be purchased to indemnify against loss caused by risks associated with the commodity from different sources. Typically, the cost of the commodity and the financial instrument will vary depending upon the amount being purchased, the location of the customer, transportation variables, the capacity of the commodity provider and other factors.

In another embodiment of the present invention, online auctions are conducted to sell a commodity and a bundled financial instrument, such as an insurance instrument, to indemnify against loss associated with at least one risk related to purchase of the commodity by respective bidders, to the highest bidder. In one example, a system to manage the sale of a commodity bundled with an insurance instrument is disclosed. The system comprises memory to store prices for respective bundled products comprising a commodity and a respective insurance instrument to indemnify against loss associated with at least one risk related to the purchase of the commodity by respective bidders. A processor is coupled to the memory. The processor is programmed to provide each bidder a respective price for a respective bundled product. The processor is also programmed to determine which of the bids received from bidders exceeds the respective price provided to each bidder, by a greater amount. The bundled product is sold to that bidder. In another example of a related embodiment, the memory stores commodity price data and insurance valuation data, and the processor, which is coupled to a network, is programmed to determine a respective price for respective bundled products for each of a plurality of bidders. Methods are disclosed, as well.

The commodity may be electrical power, natural gas, water, or telecommunications bandwidth, for example. The risk may be a risk of interruptions in delivery. The price or value of the insurance may depend on one or more factors associated with each bidder, for example. Different prices may therefore be provided to each bidder, for respective bundled products.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings in which.

DETAILED DESCRIPTION OF THE INVENTION

Reference will now be made to the preferred embodiment of the invention. An example of the preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications and equivalents as may be included within the spirit and scope of the invention as defined by the appended claims. In the following description, numerous specific details are set forth in order to provide a thorough understanding of the present invention. The present invention may be practiced without some or all of these specific details. In other instances, traditional process operations have not been described in detail in order to not unnecessarily obscure the present invention.

Figure 1A:
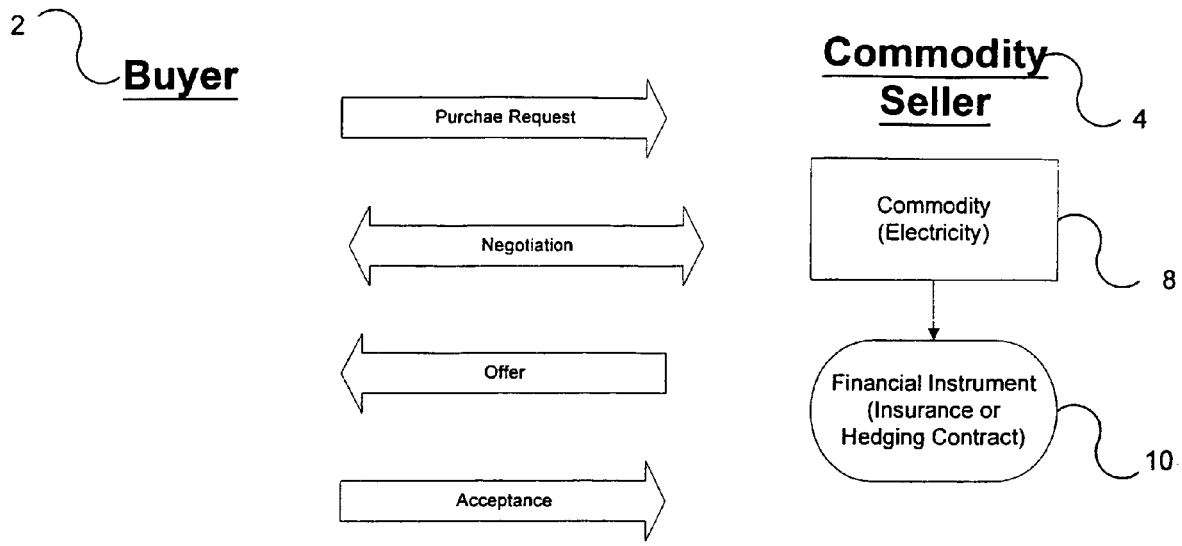
FIG. 1a is an overview description of the operational model of the present invention wherein a buyer purchases a combined commodity and financial instrument from a commodity seller.
Figure 1B:
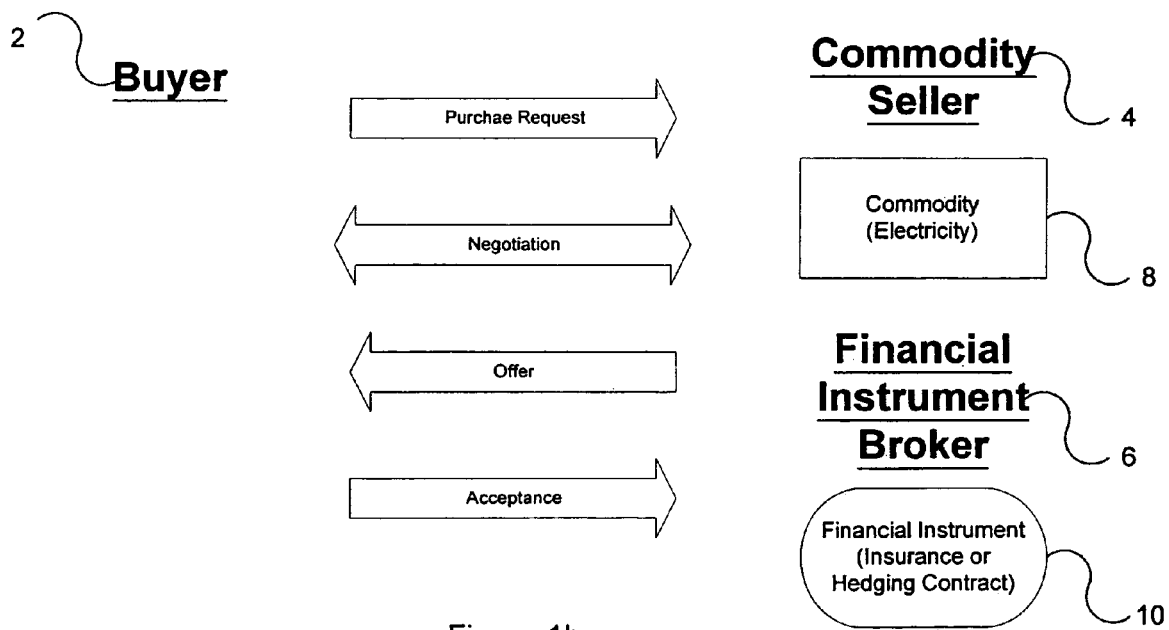
FIG. 1b is an overview description of the operational model of the present invention wherein a buyer purchases a commodity from a commodity seller and a financial instrument from a financial instrument broker.

In a tier-priced industry, the use of a financial instrument to guarantee commodity delivery and lower the cost of delivering the commodity can be implemented in two distinct ways. FIG. 1a illustrates a buyer 2 purchasing a tier-priced commodity 8 bundled with a financial instrument 10 from a commodity seller 4. In this example the buyer negotiates the purchase of the bundled commodity 8 and financial instrument 10 with the commodity seller 4. The financial instrument 10 would be triggered and executed to absorb the additional costs of purchasing spot power under the conditions described in the financial instrument. In the preferred embodiment the tier-priced commodity is electrical power being sold by a generating utility or broker and the financial instrument is an insurance policy or hedging contract. The buyer 2 may be any consumer of the purchased commodity 8 (i.e. an individual, a large manufacturing concern, a rural cooperative, a municipality or another generating utility) and the seller 4 may be a commodity generating utility or commodity reseller. In one embodiment, the financial instrument 10 is offered by the commodity provider 4 along with the commodity 8 as a bundled product (the purchase price of the commodity includes the purchase price of the financial instrument used to guarantee the delivery of the commodity). FIG. 1b illustrates an alternative embodiment in which the buyer 2 purchases the financial instrument 10 and the commodity 8 separately. In this example the financial instrument 10 is purchased from a financial instrument broker 6 such as an insurance company (in the case of an insurance policy) or brokerage house (in the case of a hedging contract or derivative contract).

Figure 2A:
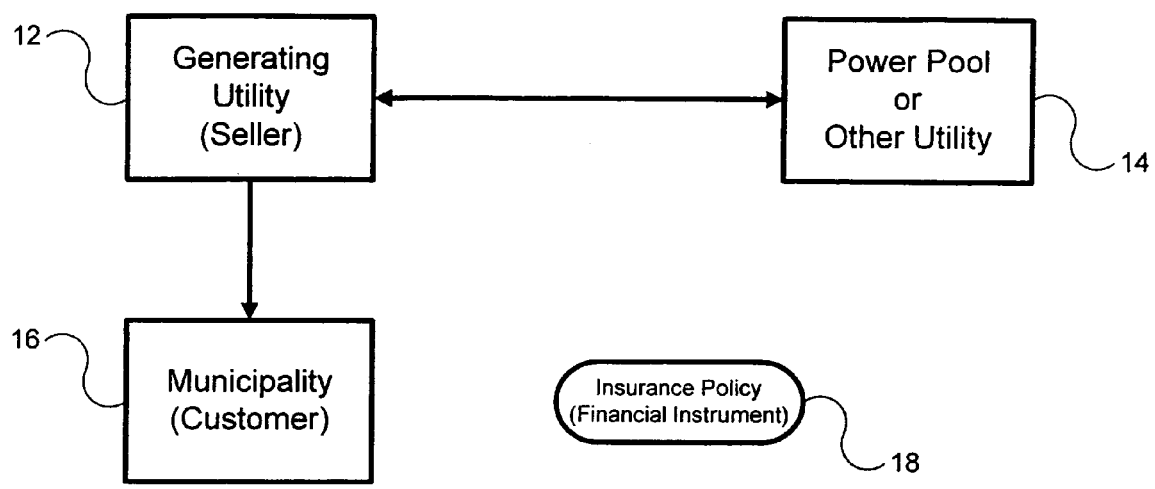
FIG. 2a illustrates one embodiment of the present invention in which a financial instrument is in place guaranteeing delivery of electrical power and there is no interruption.

FIG. 2a illustrates the use of an insurance policy 18 to protect against an interruption in service to a customer 16 (in this example a municipality). In FIG. 2a a municipality 16 purchases interruptible power from a generating utility 12.

Figure 2B:
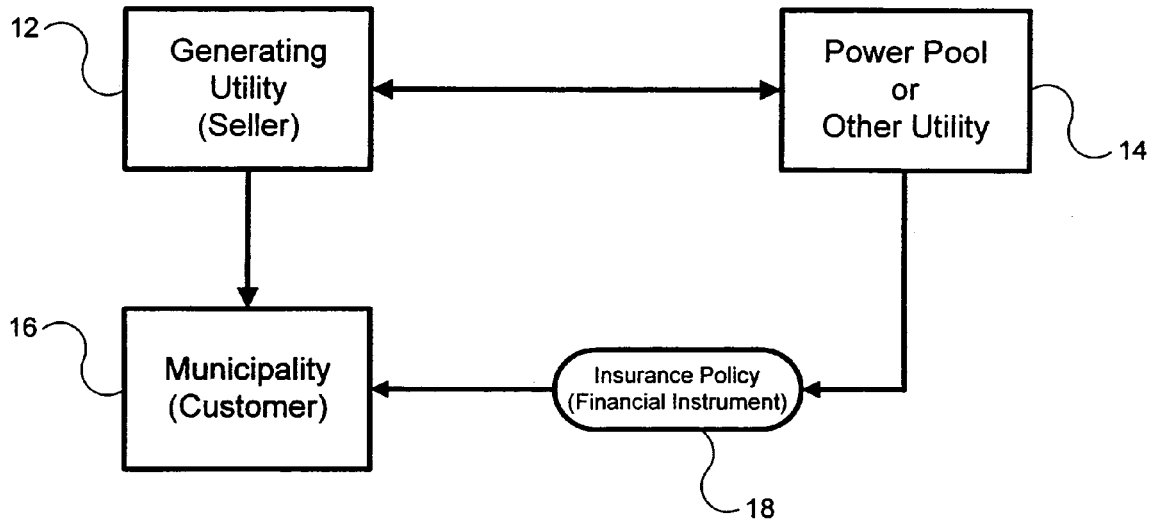
FIG. 2b illustrates one embodiment of the present invention in which a financial instrument is in place guaranteeing delivery of electrical power and there is an interruption.

The municipality 16 has also purchased an insurance policy 18 as part of a bundled product from the generating utility 12 or an insurance company such as the financial instrument broker 10 (See FIG. 1b). If there is no interruption in service then the municipality 16 receives its power as contracted from the generating utility 12 and there is no need to purchase spot power from another utility 14 (or the power pool). Purchasing a commodity supported by an insurance policy 18 allows the municipality 12 to purchase power at a reduced interruptible rate. The insurance policy 18 takes effect if there is an interruption in service governed by the terms of the policy. Typically, the terms of the insurance policy will cover foreseeable interruptions and not force majeure events. The insurance policy 18 is designed to take into account the risks associated with purchasing interruptible power. A risk coefficient may be calculated based on the risks associated with purchasing the commodity at the lower tier, for example. These risks include historical data regarding the weather in and around the municipality 16 (the consuming area), the current/predicted future capacity of the generating utility 12 and the current/predicted future demands of the municipality 16 (the load profile). If there is an interruption in service, the insurance policy 18 will provide the finances necessary to allow the generating utility 12 to purchase or generate needed power to supplement the interruption. In the case where the municipality 16 holds the insurance policy 18 (purchased it separately from the commodity) the financial proceeds of the policy are paid to the generating utility 12 or an alternative source 14 or a transmitting utility to augment supply by purchasing or generating additional power. Referring to FIG. 2b, with the insurance policy 18 covering the cost of purchasing expensive spot power, the alternative source 14 (the providing utility or power pool) would transfer the supplemental power to the municipality through the generating utility 12 or through another system (transmitting/distributing utility) depending upon the circumstances.

When a municipality 16 (or any customer for that matter) is the insurance policy holder, an agreement among the electricity provider, the insurance provider, and the end-user would be structured to provide interruptible power under a mutually acceptable set of circumstances. This agreement allows the generating utility 12, through their trading floor, to purchase power for interruptions on behalf of the municipality 16 (including the end users), using funds provided by the insurance policy held by the municipality 16. In an alternative embodiment the end-users would contract directly with the generating utility and the insurance provider.

Figure 3A:
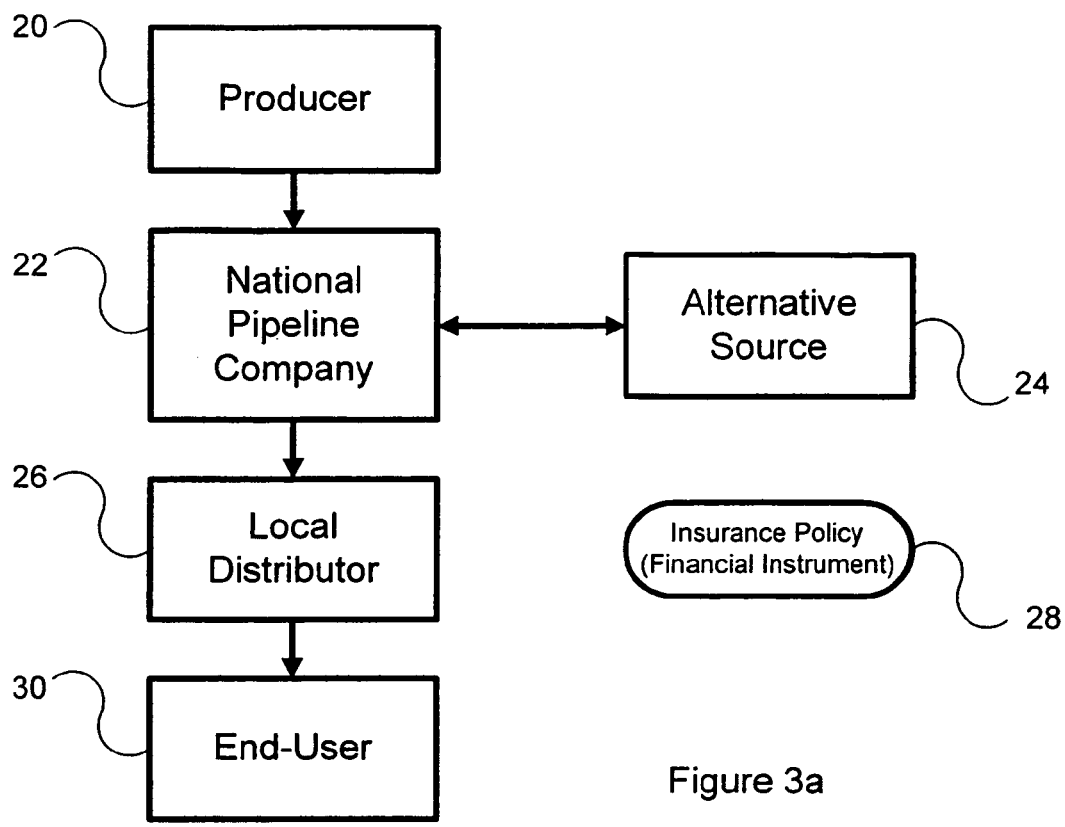
FIG. 3a illustrates one embodiment of the present invention in which a financial instrument is in place guaranteeing delivery of natural gas and there is no interruption.
Figure 3B:
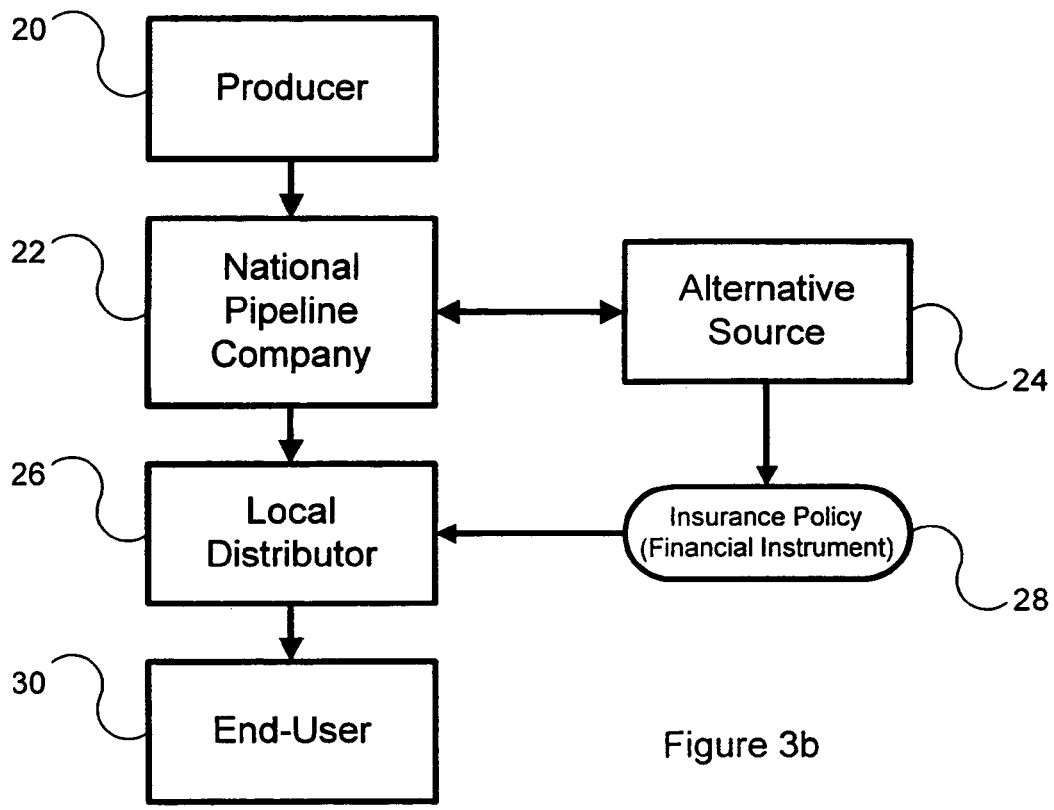
FIG. 3b illustrates one embodiment of the present invention in which a financial instrument is in place guaranteeing delivery of natural gas and there is an interruption.

FIGS. 3a and 3b illustrate the application of the present invention to the natural gas industry. A natural gas producer 20 provides gas to a national pipeline company 22 which is conceptually similar to the national electrical grid. The national pipeline company 22 provides gas to a local distributor 26 who in turn provides gas to the end-user 30. In the event of an interruption in gas service (which may be occasioned for equally predictable reasons as they are in the electrical industry) an insurance policy 28 (or other financial instrument) will provide the funds to supplement the interruption from an alternative source 24.

The implementation of the present invention from the generating utility and end-user may be accomplished via traditional business means (typically written agreements) or via a computerized transaction. If the transaction is carried out over a computer network (via the Internet in the preferred embodiment), a wholesale or retail customer would be able to purchase the utility commodity from the provider either with or without an attached financial instrument. The purchaser would also be able to purchase the commodity from one provider and the financial instrument from a separate financial broker. Sales by a utility may be conditioned upon the purchase of an insurance policy by the purchaser. In another embodiment, an alternative energy provider may sell hedge contracts supported by its own power generating surplus. In yet another embodiment, purchasers bid on available power and financial instrument from a variety of different providers.

Figure 4:
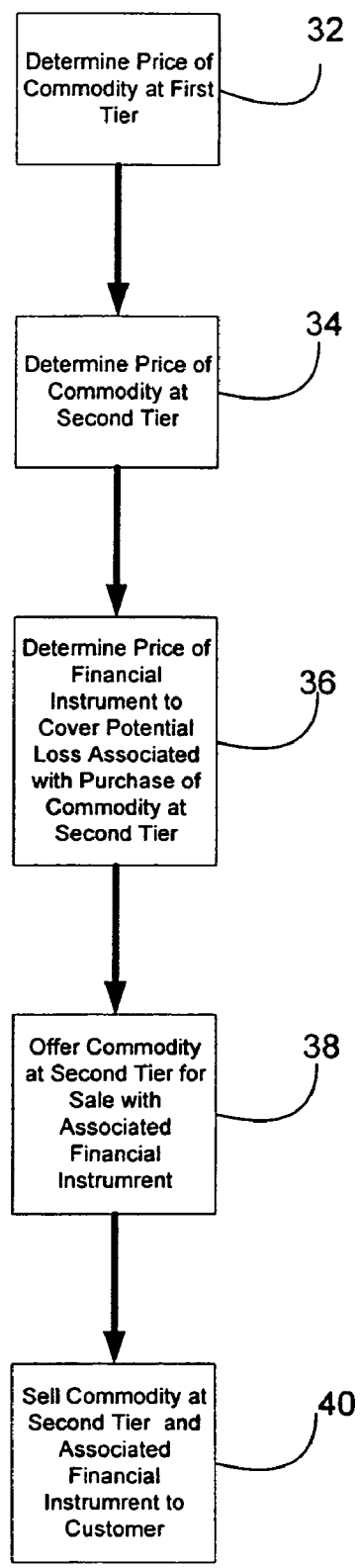
FIG. 4 is a flowchart illustrating the method steps of one embodiment of the present invention.

FIG. 4 illustrates the method steps of the present invention as they would be carried out through traditional processes or as implemented in software on one or more computers. At step 32 a price is determined for the commodity at a first tier. In the preferred embodiment, this will be the price for firm electrical power in a particular class (residential, industrial, etc.) which will be the most expensive electrical power available in that class. At step 34 the price for the commodity at a second tier within the same class is determined. In the preferred embodiment, this will be interruptible power in the same class available for a substantially lower price than the power in the first tier. The price determinations made in steps 32 and 34 are accomplished using any of a number of well known techniques. One source of information useful in determining these prices is Federal Energy Regulatory Commission (FERC) Open-Access Same-time Information System (OASIS) provides information about available transmission capacity. At step 36 a price is determined for a financial instrument to cover the loss which would be suffered in the event of a foreseeable interruption in service associated with the purchase of the second tier commodity. Typically the financial instrument is designed to cover the potential foreseeable interruptions and not force majeure events. However, coverage for force majeure events could be included in an alternative embodiment of the present invention. At step 38 the generating utility or broker offers the bundled commodity (interruptible power) and financial instrument (typically an insurance policy). The second tier commodity and indemnifying financial instrument are then sold to a customer at step 40.

Figure 5A:
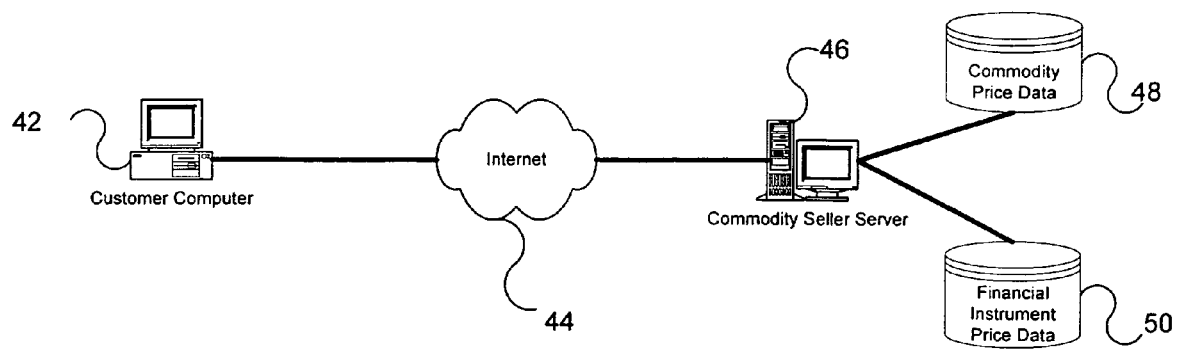
FIG. 5a is a diagram illustrating the use of a client computer to contact a commodity seller computer to carry out the present invention.
Figure 5B:
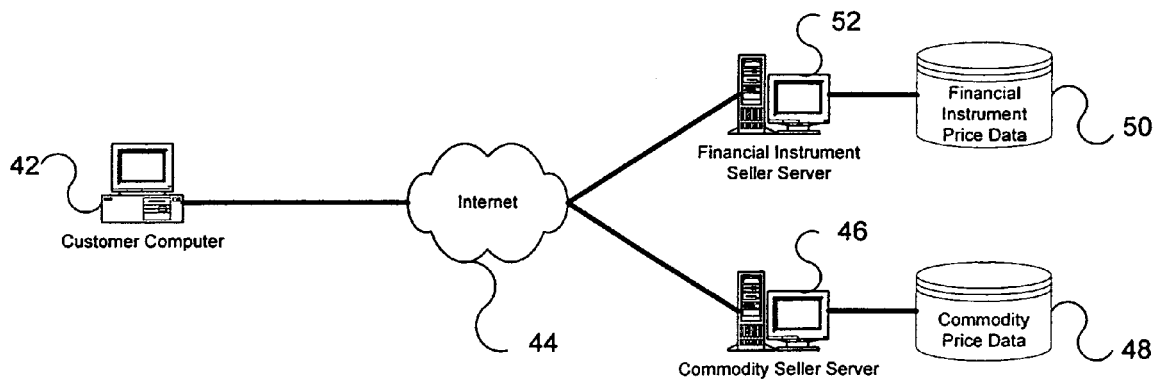
FIG. 5b is a diagram illustrating the use of a client computer to contact a commodity seller computer and a financial instrument seller computer to carry out the method of the present invention.

FIGS. 5a and 5b illustrate a system implementing the present invention over a computer network. A customer using customer computer 42 would connect to a commodity seller computer 46 via a computer network such as the Internet 44. The commodity seller computer 46 has access to commodity price data 48 and financial instrument price data 50. The price data may be stored on the commodity seller server 46 or another computer. FIG. 5b illustrates a bifurcated system in which there is a financial instrument seller computer 52 in addition to the commodity seller computer 46. In the preferred embodiment the interface between the customer computer 42 and the commodity seller computer 46 and the financial instrument seller computer 52 is implemented as a web page accessible to the customer via the World Wide Web. In an alternate embodiment the customer would contact a brokering computer which would in turn contact the commodity seller computer 46 and the financial instrument seller computer 52.

Figure 6:
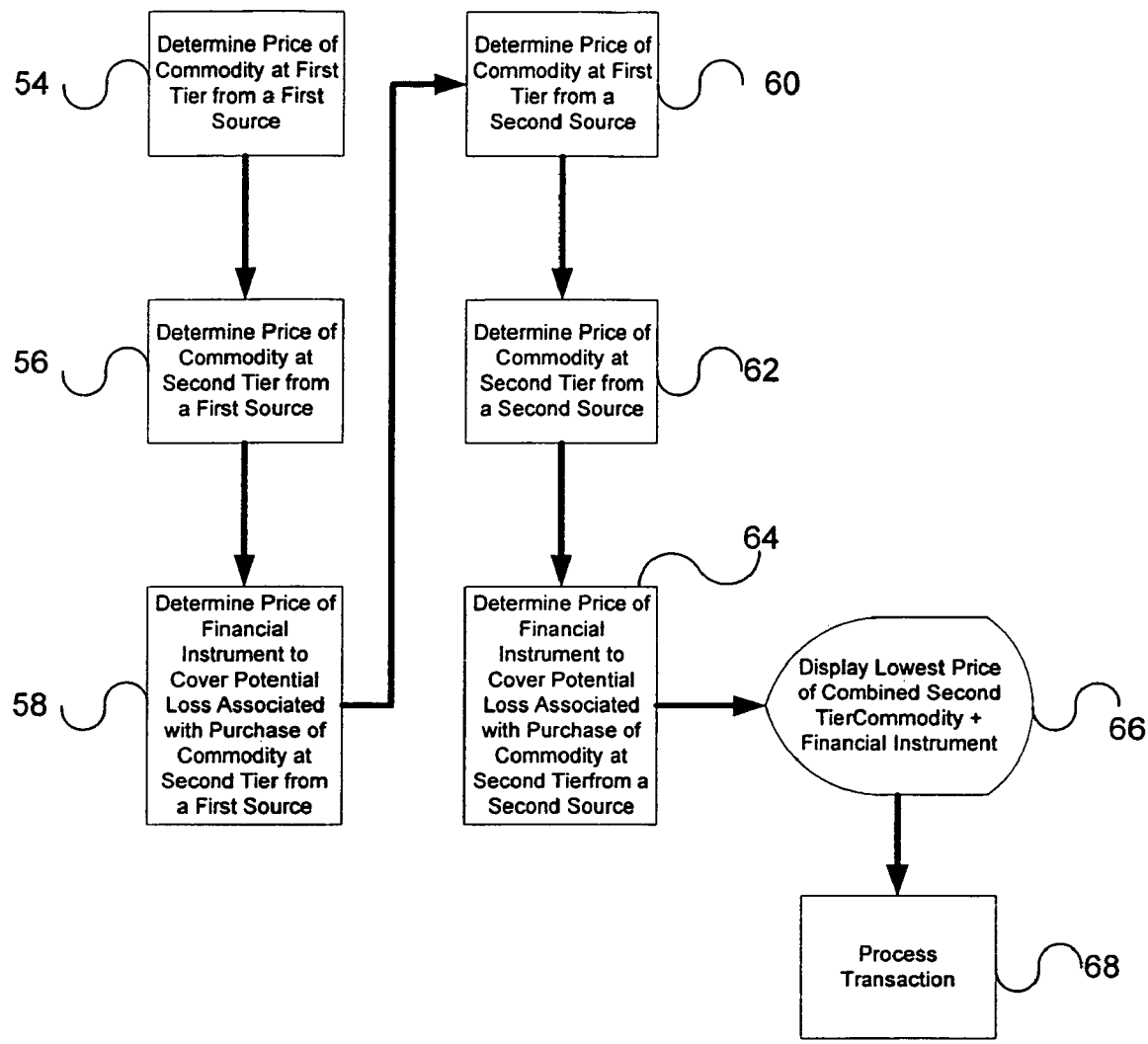
FIG. 6 is a flowchart illustrating the method steps of one embodiment of the present invention.

Referring to FIG. 6, the method steps of the present invention are illustrated for an embodiment in which a customer is presented with the lower of two prices from two or more sources. At step 54 the price for a first tier commodity from a first source is determined. At step 56 the price for a second tier commodity from a first source is determined. At step 58 a price is determined for a financial instrument to cover the loss which would be suffered in the event of a foreseeable interruption in service associated with the purchase of the second tier commodity from a first source. At step 60 the price for a first tier commodity from a second source is determined. At step 62 the price for a second tier commodity from a second source is determined. At step 64 a price is determined for a financial instrument to cover the loss which would be suffered in the event of a foreseeable interruption in service associated with the purchase of the second tier commodity from a second source. At step 66 the lowest combined price for a second tier commodity and bundled financial instrument is displayed to a customer and at step 68 the transaction is processed.

Figure 7:
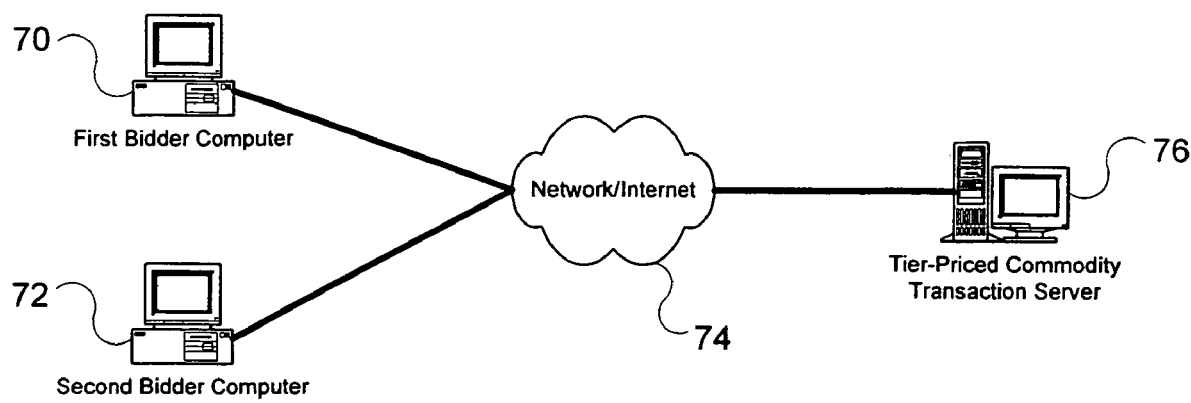
FIG. 7 is a diagram illustrating a multiple bid implementation of the system of the present invention.

FIG. 7 illustrates an implementation of the present invention facilitating an online auction for a commodity and bundled financial instrument. A first bidder computer 70 and a second bidder computer 72 are connected via a computer network such as the Internet 74 to a tier-priced commodity transaction server 76. The tier-priced commodity transaction server 76 presents the first bidder computer 70 and the second bidder computer 72 starting bids (prices personalized for each participating bidder) for a given commodity at a specified tier and an associated financial instrument. The prices may be different for each bidder. The potential bids are accepted by the tier-priced commodity transaction server 76 and the commodity and bundled financial instrument is sold to the highest bidder.

More particularly, the starting price or bid for the first bundled product for the first bidder and the starting price or bid for the second bundled product for the second bidder are determined by the transaction server 76 and provided to the first bidder computer 70 and the second bidder computer 72, respectively, via the network 74. The network may be the Internet. The respective prices are displayed to the first and second bidders by the first and second bidder computers 70, 72, respectively. The first and second bidders submit their bids to the commodity transaction server 76, via their respective computers 70, 72, and the network 74. The commodity transaction server 76 sells the first bundled product to the first bidder if the first bidder exceeds the first price by a greater amount than the second bidder exceeds the second price. The commodity transaction server 76 sells the second bundled product to the second bidder if the second bidder exceeds the second price by a greater amount than the first bidder exceeds the first price.

Figure 8:
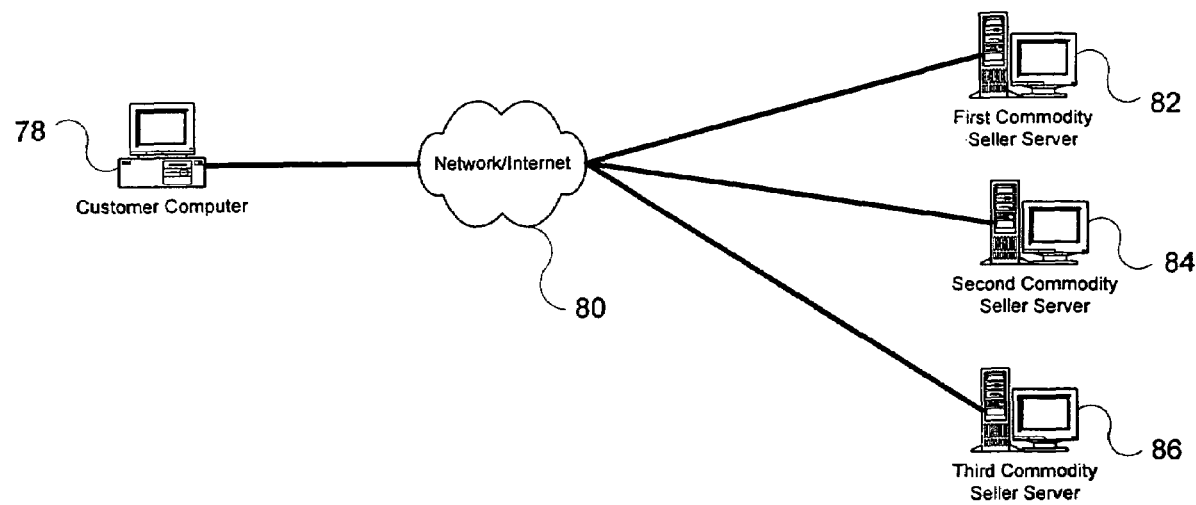
FIG. 8 illustrates the system of the present invention being used to solicit quotes from more than one seller.

FIG. 8 shows customer computer 78 connecting to commodity seller computers 82, 84, and 86 via a network, such as the Internet 80. The customer computer 78 presents the commodity seller computers 82, 84, and 86 with its commodity requirements and information necessary to determine the cost of the requested commodity and the associated financial instrument. In an alternate embodiment, the customer computer 78 connects to a querying computer which collects information from the customer, retrieves the price combinations from the commodity seller computers 82, 84, and 86 and returns the best offer price to the customer. In yet another embodiment the querying computer contacts both commodity seller computers 82, 84, and 86 and financial instrument selling computers and presents the customer with the best combined price.

Although the foregoing invention has been described in some detail for the purpose of clarity of understanding, it will be apparent that certain changes and modifications may be practiced within the scope of the appended claims. Accordingly, the present embodiments are to be considered illustrative and not restrictive, and the invention is not to be limited to the details given herein, but may be modified within the scope and equivalents of the appended claims.

I claim:

1. A method of operating a processor coupled to a network to manage the sale of a commodity, the method comprising:
providing, by a processor, over a network, a respective price for a respective bundled product to each of a plurality of bidders, each bundled product comprising the commodity and a financial instrument to indemnify against loss associated with at least one risk related to purchase of the commodity by a respective bidder;
receiving, by the processor, via the network, bids for respective bundled products from bidders; and
determining, by the processor, which of the bidders to sell a respective bundled product to based, at least in part, on which of the bidders exceeds their respective price by a greater amount.

2. The method of claim 1, further comprising:
selling, by the processor, over the network, the respective bundled product to the respective bidder who exceeds their respective price by the greatest amount.

3. The method of claim 1, comprising:
determining the respective prices by the processor based, at least in part, on a price for the commodity for sale to each respective bidder with the at least one risk and a value for the financial instrument to indemnify each respective bidder.

4. The method of claim 3, wherein:
the values of respective financial instruments are based, at least in part, on one or more factors associated with each respective bidder.

5. The method of claim 1, comprising:
providing a respective price to a respective second processor, via the network, to be displayed to a respective bidder.

6. The method of claim 5, comprising:
receiving bids by the first processor from the respective second processors, via the network.

7. The method of claim 1, wherein the commodity is chosen from the group consisting of electricity, natural gas, water, and telecommunications services.

8. The method of claim 1, wherein:
the at least one risk includes a risk of interruptions in delivery to each bidder; and
respective insurance instruments indemnify against loss associated with the interruptions.

9. The method of claim 1, wherein the financial instrument is an insurance instrument.

10. A system to manage the sale of a commodity, the system comprising:
memory storing data related to prices for respective bundled products, each bundled product comprising the commodity and a respective insurance instrument to indemnify against loss associated with at least one risk related to purchase of the commodity by each of a plurality of respective bidders; and
a processor coupled to the memory, wherein the processor is programmed to:
provide each respective bidder a respective price for a respective bundled product;
wherein the processor receives bids from respective bidders and the processor is further programmed to:
determine which of the received bids from the respective bidders exceeds the respective price provided to each bidder by a greater amount; and
determine which bidder to sell the respective bundled product to based on the determination of which of the received bids exceeds their respective price by the greater amount.

11. The system of claim 10, wherein the memory further stores data related to commodity price data and insurance valuation data, and the processor is further programmed to:

determine the prices based, at least in part, on a respective price for the commodity for sale to each bidder with the at least one risk and a value for the respective insurance instrument.

12. The system of claim 10, wherein:
the values of the insurance instruments are based, at least in part, on one or more factors associated with each respective bidder.

13. The system of claim 10, wherein the processor is coupled to a network and is further programmed to:
provide the prices to one or more respective second processors, via the network, to display a respective price to one or more respective bidders.

14. The system of claim 10, wherein the commodity is chosen from the group consisting of electricity, natural gas, water, and telecommunications services.

15. The system of claim 10, wherein:
the at least one risk includes a risk of interruptions in delivery to each bidder; and
respective insurance instruments each indemnify against loss associated with the interruptions.

16. The system of claim 10, wherein in the processor is further programmed to:
sell the respective bundled product to the bidder exceeding their respective price by the greater amount, over the network.

17. A system to manage the sale of a commodity, the system comprising:
memory storing data related to commodity price data and insurance valuation data; and
a first processor coupled to a network, the processor programmed to:
determine a respective price for each of a plurality of bidders for a respective bundled product comprising the commodity and a respective insurance instrument to indemnify against loss associated with at least one risk related to the purchase of the commodity by each bidder; and
provide to a respective second processor associated with each respective bidder the determined respective price;
wherein the first processor receives bids for the bundled products input by the respective bidders from respective second processors via the network, the first processor being further programmed to:
determine which of the received bids from the bidders exceeds the respective price provided to each bidder by a greater amount; and
sell the bundled product to the respective bidder exceeding their respective price by the greater amount, via the network.

18. A system to manage the sale of a commodity to at least first and second bidders, the system comprising:
memory storing data related to commodity price data and insurance valuation data; and
a processor coupled to a network, the processor programmed to:
determine a first price for a first bundled product comprising a commodity and a first insurance instrument to indemnify against loss associated with at least one risk related to the purchase of the commodity by each bidder; and
provide the first price to the first bidder;
determine a second price for a second bundled product comprising the commodity and a second insurance instrument to indemnify against loss associated with at least one risk related to the purchase of the commodity by each bidder; and
provide the second price to the second bidder;
receive first and second bids for the first and second bundled products from the first and second bidders, respectively;
determine which of the first and second bids exceeds their respective first and second prices by the greater amount; and
sell the bundled product to the bidder that exceeds their respective price by the greater amount.

19. The system of claim 18, wherein the processor is programmed to:
provide the first price to a processing device of the first bidder coupled to the network; and
provide the second price to a processing device of the second bidder, coupled to the network.

* * * * *